United States Patent
Muldoon

(10) Patent No.: US 9,716,847 B1
(45) Date of Patent: Jul. 25, 2017

(54) IMAGE CAPTURE DEVICE WITH ANGLED IMAGE SENSOR

(71) Applicant: Google Inc., Mountain View, CA (US)

(72) Inventor: Ian Rickard Muldoon, Redwood City, CA (US)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 14/670,984

(22) Filed: Mar. 27, 2015

Related U.S. Application Data

(63) Continuation of application No. 13/626,407, filed on Sep. 25, 2012, now abandoned.

(51) Int. Cl.
*H04N 5/345* (2011.01)
*H04N 5/349* (2011.01)
*H04N 5/232* (2006.01)

(52) U.S. Cl.
CPC ......... *H04N 5/349* (2013.01); *H04N 5/23212* (2013.01); *H04N 5/345* (2013.01)

(58) Field of Classification Search
CPC ..... H04N 5/349; H04N 5/23212; H04N 5/345
See application file for complete search history.

(56) References Cited

U.S. PATENT DOCUMENTS

| | | | |
|---|---|---|---|
| 4,314,150 A | 2/1982 | Takayama et al. | |
| 4,376,303 A | 3/1983 | Lurie | |
| 4,802,757 A | 2/1989 | Pleitner et al. | |
| 4,808,807 A | 2/1989 | Hershel | |
| 4,816,665 A | 3/1989 | Hsu | |
| 5,307,170 A | 4/1994 | Itsumi et al. | |
| 5,559,767 A | 9/1996 | Matsui | |
| 6,023,056 A | 2/2000 | Fiete et al. | |
| 6,207,967 B1 | 3/2001 | Hochstein | |
| 6,803,990 B2 | 10/2004 | Amano | |
| 7,083,096 B2 | 8/2006 | Breytman et al. | |
| 7,329,859 B2 | 2/2008 | Mizutani et al. | |
| 7,605,860 B2 | 10/2009 | Saitoh et al. | |
| 7,723,657 B2 | 5/2010 | Altendorf et al. | |
| 8,125,615 B2 | 2/2012 | Kalf et al. | |
| 9,383,540 B1 * | 7/2016 | Gandhi | G02B 7/008 |

(Continued)

FOREIGN PATENT DOCUMENTS

EP 1696255 A1 8/2006
WO WO 2011080670 7/2011

OTHER PUBLICATIONS

Hartley et al., "Linear Pushbroom Cameras", IEEE Transactions on Pattern Analysis and Machine Intelligence, Sep. 1997, vol. 19, No. 9, pp. 963-975.

*Primary Examiner* — Abdelaaziz Tissire
(74) *Attorney, Agent, or Firm* — Dority & Manning, P.A.

(57) ABSTRACT

An image capture device is disclosed. The image capture device may generally include an optical element configured to create a light cone having a focal plane. The image capture device may also include an image sensor having an active area defining an image plane that is angled relative to the optical element. In addition, the image capture device may include a controller communicatively coupled to the image sensor. The controller may be configured to control the image sensor such that the light passing through the optical element is detected by a readout area of the active area. The readout area may be set by the controller based on the position of the focal plane relative to the image sensor.

20 Claims, 5 Drawing Sheets

(56) References Cited

U.S. PATENT DOCUMENTS

| | | |
|---|---|---|
| 2001/0055069 A1 | 12/2001 | Hudson |
| 2002/0030756 A1 | 3/2002 | Inoue |
| 2003/0038876 A1 | 2/2003 | Nagashima |
| 2005/0068454 A1* | 3/2005 | Afsenius .................. G06T 5/50 348/345 |
| 2007/0242135 A1* | 10/2007 | Rosenblum ............ G01C 11/02 348/144 |
| 2008/0192153 A1 | 8/2008 | Kuhn et al. |
| 2010/0103300 A1 | 4/2010 | Jones et al. |
| 2011/0058085 A1* | 3/2011 | Ito .......................... G03B 13/00 348/333.02 |
| 2011/0080487 A1 | 4/2011 | Venkataraman et al. |
| 2012/0098982 A1 | 4/2012 | Wantanbe |
| 2012/0176492 A1 | 7/2012 | Garin |
| 2012/0249803 A1 | 10/2012 | Easton et al. |
| 2012/0287256 A1* | 11/2012 | Hulsken ............... G02B 21/361 348/79 |

\* cited by examiner

IMAGE CAPTURE DEVICE WITH ANGLED IMAGE SENSOR

FIELD

The present subject matter relates generally to image capture devices, such as cameras, and, more particularly, to an image capture device having an angled image sensor.

BACKGROUND

Conventional digital cameras generally include a lens, an image sensor and a controller communicatively coupled to the image sensor. As is generally understood, the lens is typically configured to receive light reflected from an object being imaged and project such light onto the image sensor. The image sensor may, in turn, be configured to detect the light projected from the lens to permit a digital image of the object to be generated. For example, the image sensor may be configured to convert the detected light into analog signals. The analog signals may then be converted by the camera's controller to digital data that can be used to generate a digital image.

Typically, focusing a camera involves adjusting the relative position of the image sensor and lens such that the lens brings the light reflected from the object being imaged into focus at the active surface of the image sensor. For imaging systems with large lenses and very small pixels, it is very difficult to maintain the relative positioning of the image sensor and lens with sufficient accuracy to account for changing operating conditions, such as thermal and/or pressure variations. In addition, by allowing adjustment of the relative position of the image sensor and lens, the camera must include moving parts, which increases the overall cost and complexity of the camera.

SUMMARY

Aspects and advantages of the invention will be set forth in part in the following description, or may be obvious from the description, or may be learned through practice of the invention.

In one aspect, the present subject matter is directed to an image capture device. The image capture device may generally include an optical element configured to create a light cone having a focal plane. The image capture device may also include an image sensor having an active area defining an image plane that is angled relative to the optical element. In addition, the image capture device may include a controller communicatively coupled to the image sensor. The controller may be configured to control the image sensor such that the light passing through the optical element is detected by a readout area of the active area. The readout area may be set by the controller based on the position of the focal plane relative to the image sensor.

In another aspect, the present subject matter is directed to a method for controlling an image capture device. The image capture device may include an optical element and an image sensor. The optical element may be configured to create a light cone having a focal plane. In addition, the image sensor may have an active area defining an image plane that is angled relative to the optical element. The method may generally include selecting a readout area for the image sensor based on a position of the focal plane relative to the image sensor and controlling the image sensor such that light is sensed by the readout area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
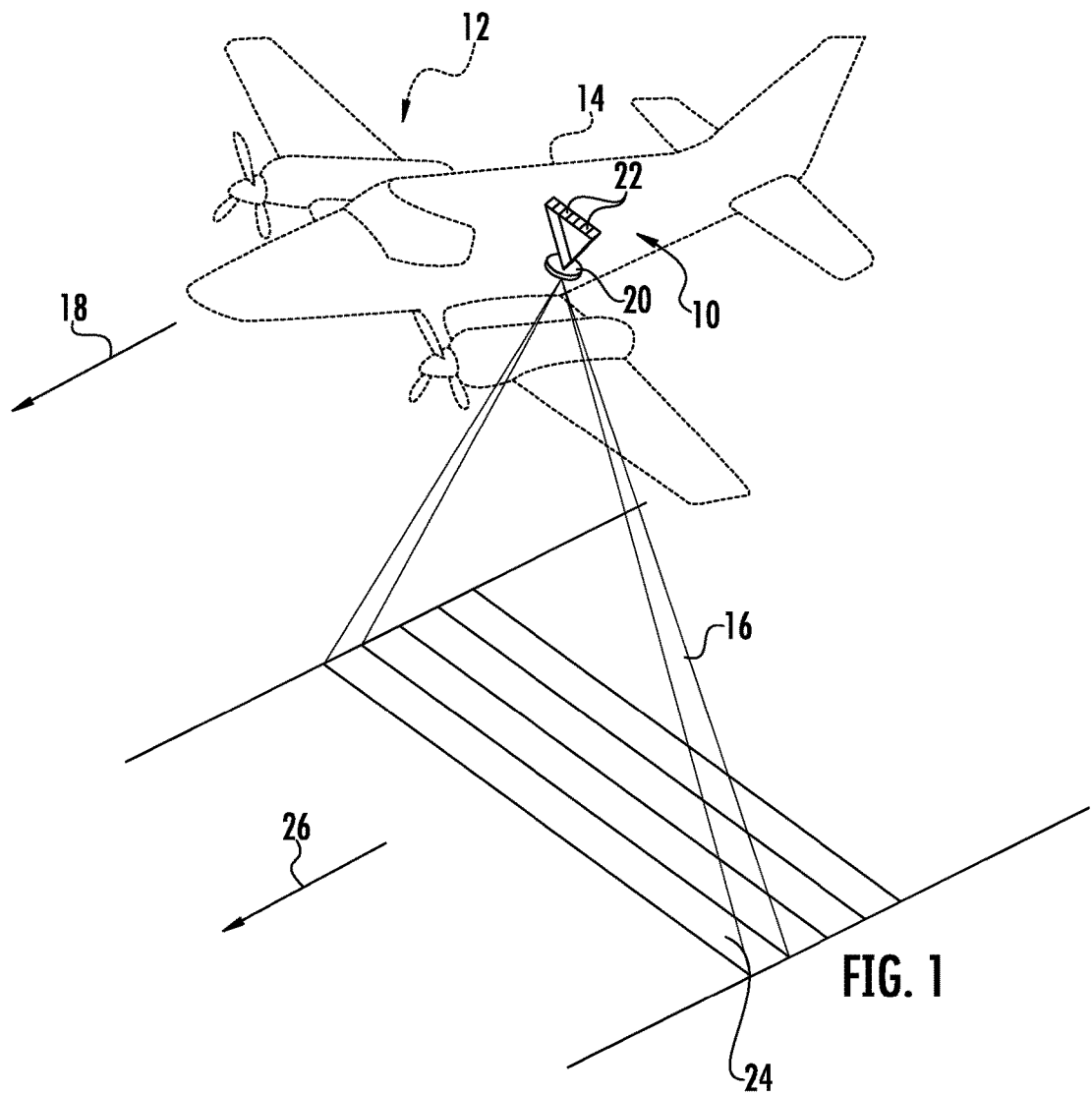
FIG. 1 illustrates a perspective view of one embodiment of an environment in which the disclosed image capture device may be advantageously utilized, particularly illustrating the image capture device mounted within an airplane for capturing aerial photography.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an image capture device including an optical element, such as a lens, and an image sensor angled relative to the lens. Specifically, in several embodiments, the image capture device may be provided with windowing functionality, wherein only a portion of the active area of the image sensor is activated. For example, the image sensor may be configured to be controlled such that its readout area only corresponds to a small strip or window of the entire active area. In such an embodiment, only this small portion of the active area must be in focus to capture sharp images. By slanting or angling the image sensor relative to the lens, the focus of the image capture device may be adjusted by simply shifting which portion of the active area is activated. For instance, as will be described below, if the focal plane of the lens shifts relative to the image sensor due to changes in the operating conditions of the image capture device (e.g., thermal and/or pressure variations), the readout area of the image sensor may be adjusted to ensure that the device continues to capture sharp, in-focus images. Such a configuration allows for focus control without need for moving parts or for otherwise adjusting the position of the image sensor relative to the lens.

Referring now to the drawings, FIG. 1 illustrates a simplified view of one embodiment of an image capture device 10 in accordance with aspects of the present subject matter, particularly illustrating one embodiment of a suitable environment within which the disclosed image capture device 10 may be advantageously used. As shown, the image capture device 10 may be positioned within an airplane 12 for capturing aerial photography of the earth's surface. Specifically, as shown, the image capture device 10 may be mounted to and/or within a fuselage 14 of the airplane 12 such that a field of view 16 of the device 10 is directed downwards towards the earth's surface. Thus, as the airplane 12 moves in a direction of travel (indicated by arrow 18), the device 10 may be configured to capture images of the earth's surface.

As shown in FIG. 1, in several embodiments, the image capture device 10 may be configured as a linear array camera (also referred to as a linear array scanner or pushbroom camera). Thus, the image capture device 10 may include an optical system, such as one or more lenses 20, configured to receive light reflected from the earth's surface. The light received by the optical system may then be projected onto an array of image sensors 22 (e.g., a one-dimensional CMOS or CCD array) configured to detect and convert the light into electrical signals associated with an image of the earth's surface contained within a view plane 24 of the image capture device 10. In such an embodiment, the instantaneous view plane 24 of the image capture device 10 may generally correspond to a linear strip of terrain extending perpendicular to the direction of travel 18 of the airplane 12. Thus, as the airplane 12 travels forward, the device 10 may capture images of successive strips of the earth's terrain along a swath path 26. These images may then be combined to form a composite, two-dimensional image of the earth's surface traversed by the sensor's field of view 16.

It should be appreciated that, in alternative embodiments, the image capture device 10 need not be configured as a linear array camera, but may generally be configured as any suitable imaging device known in the art. For example, instead of including a one-dimensional array of image sensors 22, the image capture device 10 may include a two-dimensional array of image sensors 22. Additionally, the disclosed image capture device 10 may be configured to be utilized in various other settings outside of aerial imagery, including use with various other moving and/or fixed platforms.

Figure 2:
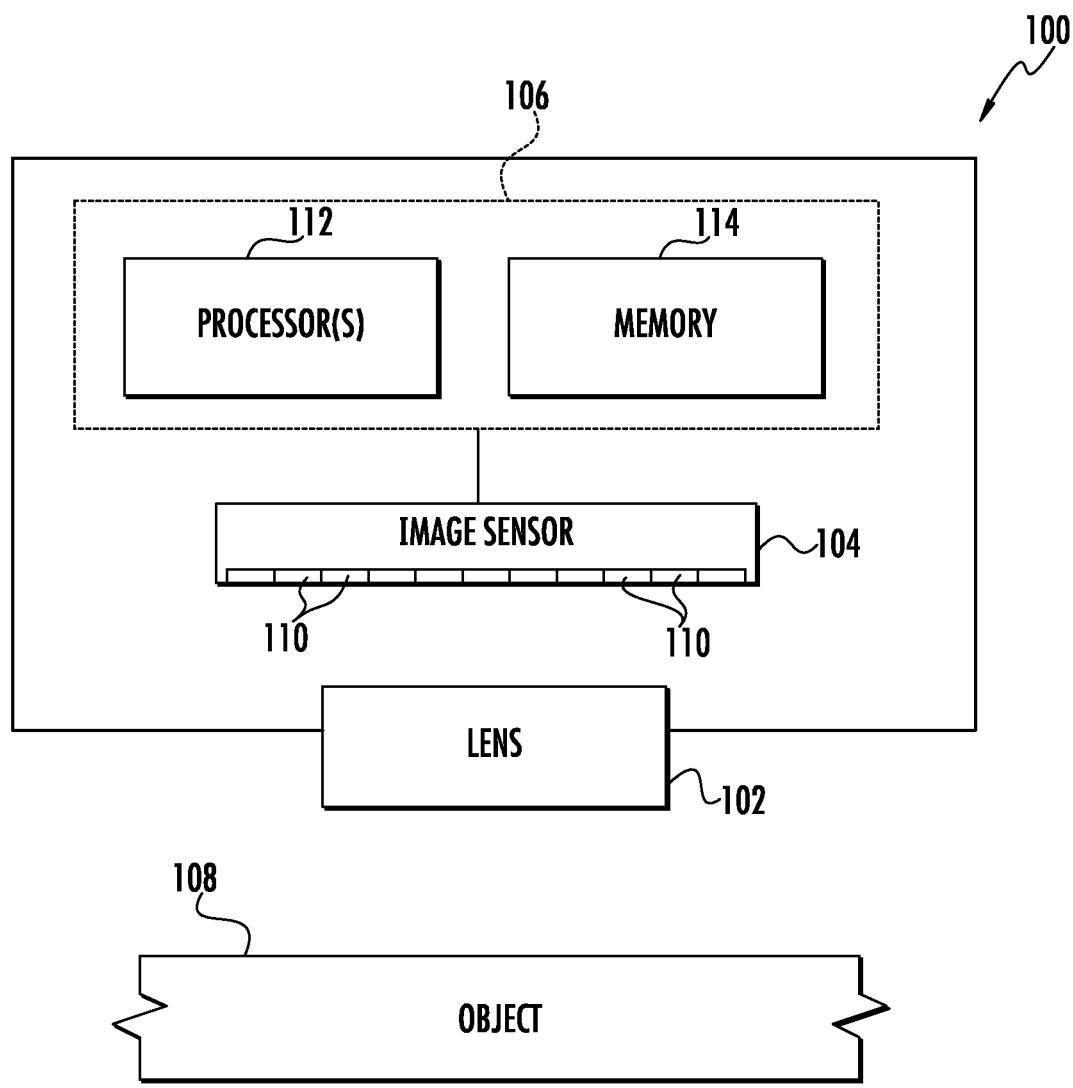
FIG. 2 illustrates a schematic view of one embodiment of the image capture device.

Referring now to FIG. 2, a schematic diagram of one embodiment of the disclosed image capture device 100 is illustrated in accordance with aspects of the present subject matter. As shown, the image capture device 100 may generally include many of the typical components of a digital camera, such as one or more optical elements (e.g., one or more lenses 102), an image sensor 104 and a controller 106. As is generally understood, the lens 102 may be configured to receive light reflected from an object 108 being imaged (e.g., the earth's surface) and project and/or focus such light onto the image sensor 104. The image sensor 104 may, in turn, be configured to detect the light projected from the lens 102 to permit a digital image of the object 108 to be generated. For example, the image sensor 104 may include a plurality of sensing elements 110 (e.g., photo detectors, photo diodes, CCD sensors or CMOS sensors and/or any other suitable image sensing elements) configured to detect light and convert such detected light into analog signals that may be used to generate a digital image.

For purposes of discussion, the operation and configuration of the image capture device 100 will generally be described below with reference to a single image sensor 104. However, it should be readily appreciated that the image capture device 100 may generally include any number of image sensors 104. For example, as described above with reference to FIG. 1, the image capture device 100 may include a plurality of image sensors 104 arranged in a one-dimensional linear array. In other embodiments, the image capture device 100 may include a two-dimensional array of image sensors 104 and/or any other suitable arrangement of image sensors 104 that permits the device 100 to function as described herein. Thus, it should be appreciated that the description of the image sensor 104 contained herein may apply to any number of image sensors 104 contained within an image capture device 100.

Additionally, it should be appreciated that, although the image capture device 100 will be described herein as including a lens 102, the device 100 may generally include any suitable optical element and/or combination of optical elements known in the art. For example, the image capture device 100 may include any combination of lenses, windows, mirrors, prisms and/or the like that provide for the focusing of light onto the image sensor 104.

Referring still to FIG. 2, the controller 106 of the image capture device 100 may generally be configured to control the operation and/or functionality of the various components of the image capture device 100, such as the image sensor 104. For example, in several embodiments, the controller 106 may be configured to control which of the sensing elements 110 of the image sensor 104 are activated at any given time, thereby providing a windowing function for the image capture device 10. As will be described below, such windowing of the image sensor 104 may generally provide numerous advantages, such as an increased frame rate and focus control. In addition, the controller 106 may also be configured to receive the analog signals generated by the image sensor 104 for subsequent processing and/or storage. For example, as is generally understood, the controller 106 may be configured to convert the analog signals into digital data that may be presented in the form of a digital image.

It should be appreciated that controller 106 may generally be any suitable computer and/or other processing device that is capable of performing the functions described herein. Thus, in one embodiment, the controller 106 may generally include one or more processor(s) 112 and associated memory 114. The processor(s) 112 may be any suitable processing device(s) known in the art. Similarly, the memory 114 may generally be any suitable computer-readable medium or media, including, but not limited to, RAM, ROM, hard drives, flash drives, or other memory devices. As is generally understood, the memory 114 may be configured to store information accessible by the processor(s) 112, including instructions that can be executed by processor(s) 112. The instructions may be any set of instructions that when executed by the processor(s) 112, cause the processor (s) 112 to provide desired functionality. For instance, the instructions can be software instructions rendered in a computer-readable form. When software is used, any suitable programming, scripting, or other type of language or combinations of languages may be used to implement the teachings contained herein. Alternatively, the controller 106 may include any suitable hardware capable of implementing the methods and/or otherwise providing the functionality described herein. In such an embodiment, for example, the instructions can be implemented by hard-wired logic or other circuitry, including, but not limited to application-specific circuits.

It should also be appreciated that the controller 106 may be configured as a separate component from the image sensor 104, such as that shown in FIG. 2, and/or the controller 106 may be configured as an integral component of the image sensor 104. For instance, in one embodiment, the image sensor 104 may, itself, include a processor 112 and associated memory 114 for processing the signals generated by the sensing elements 110 and/or for storing relevant data. Additionally, it should be appreciated that controller 106 may be a single processing device or any combination of processing devices that may be utilized to control the operation and/or functionality of the components of the image capture device 100.

Figure 3:
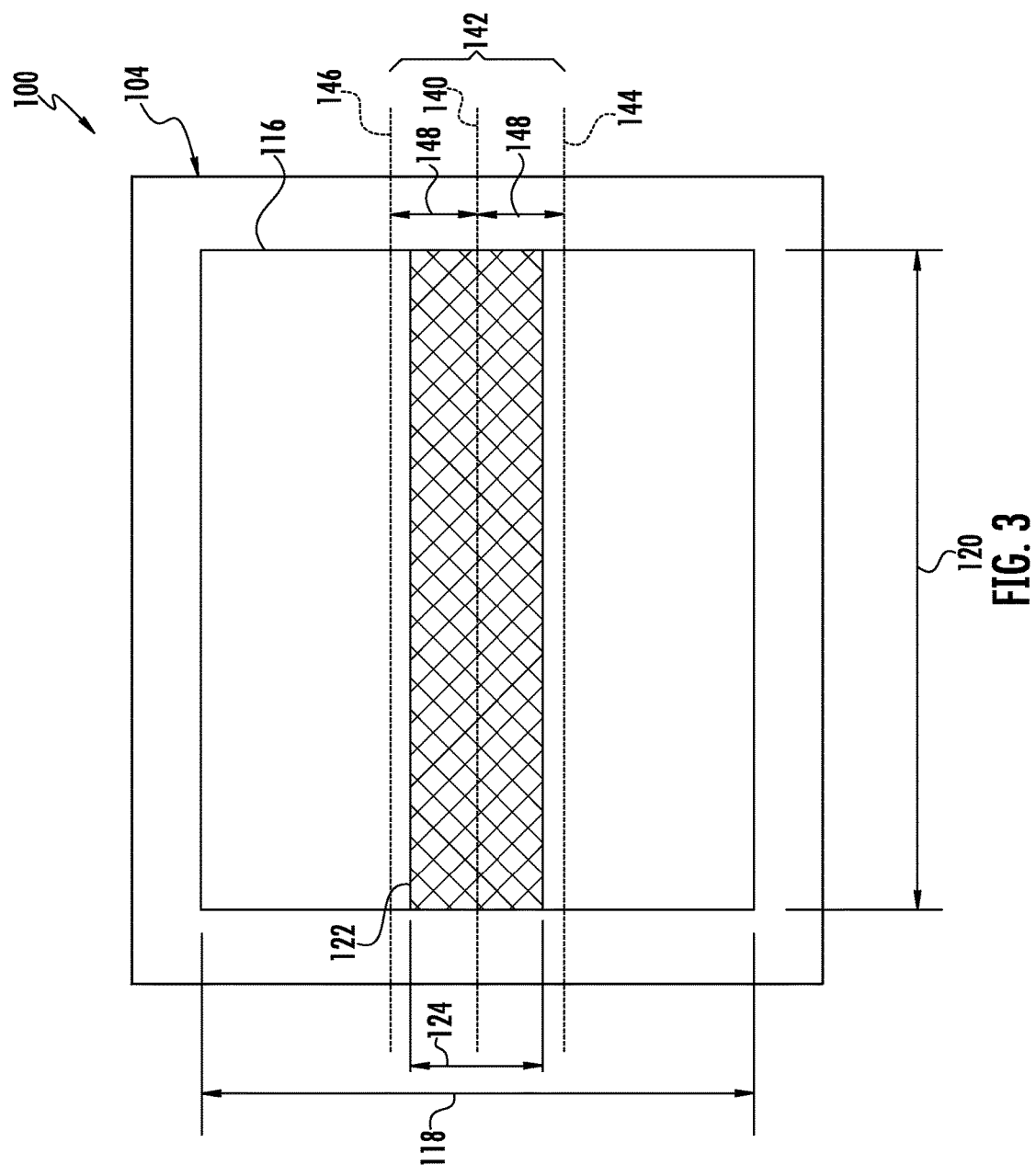
FIG. 3 illustrates a front view of one embodiment of an image sensor of the image capture device, particularly illustrating an active area of the image sensor.
Figure 4:
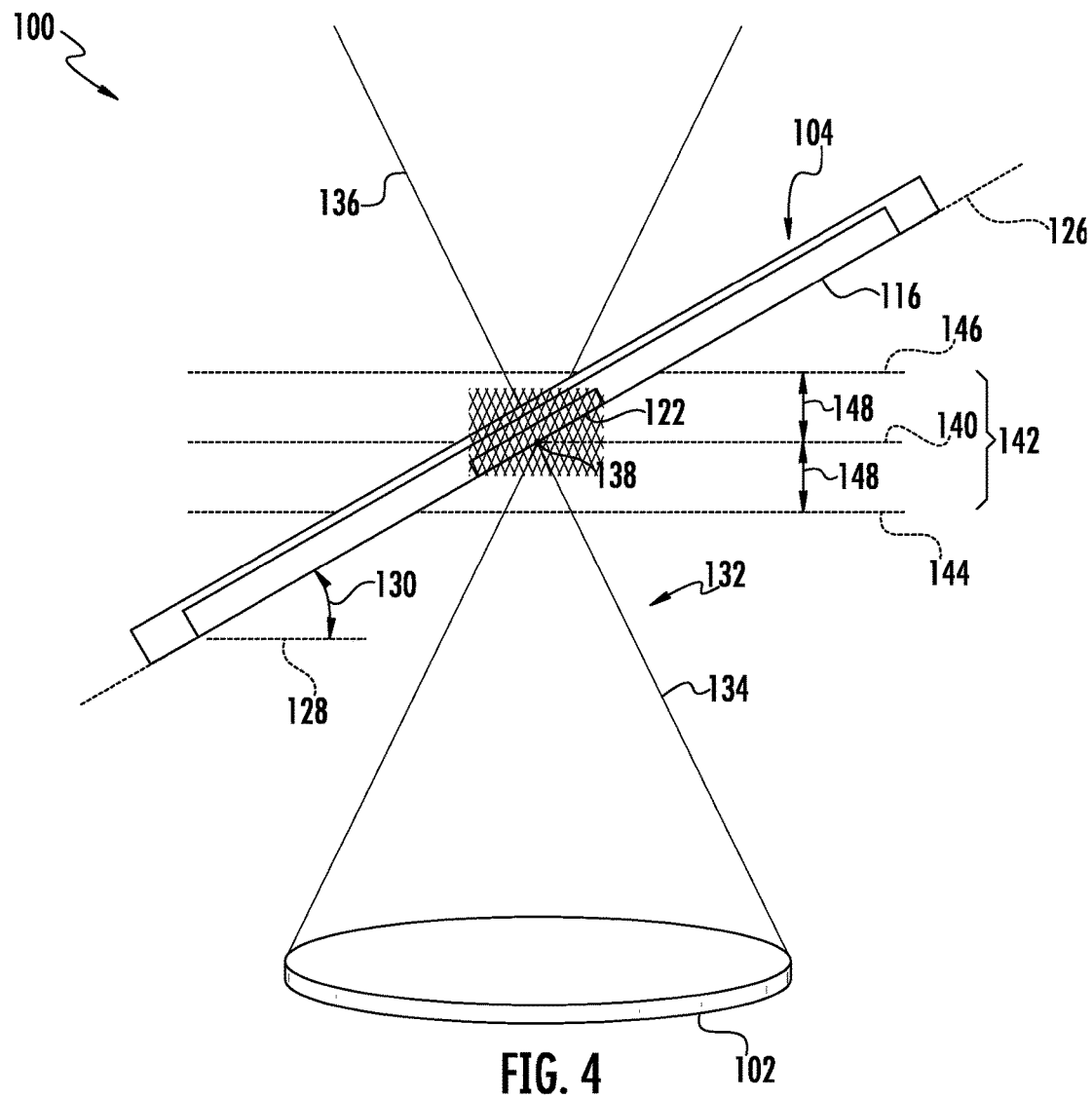
FIG. 4 illustrates a side view of the image sensor shown in FIG. 3, particularly illustrating the angled orientation of the image sensor relative to a lens of the image capture device.

Referring now to FIGS. 3 and 4, differing views of several components of the disclosed image capture device 100 are illustrated in accordance with aspects of the present subject matter. In particular, FIG. 3 illustrates a front view of the image sensor 104 of the image capture device 100. In addition, FIG. 4 illustrates a simplified, schematic view of the orientation of the image sensor 104 relative to the lens 102 of the image capture device 100.

As shown in FIG. 3, the image sensor 104 may define a sensor or active area (indicated by box 116 having a height 118 and a width 120) corresponding to the area along which the sensing elements 110 (FIG. 2) are distributed along the image sensor 104. Thus, the active area 116 may generally define the full-frame area for the image sensor 104 (i.e., the maximum area across which light can be detected by the image sensor 102). Specifically, when capturing a full-frame image, the image capture device 100 may be configured to readout and process signals provided by the sensing elements 110 across the entire active area 116. Alternatively, the controller 106 (FIG. 2) may be configured to control the image sensor 102 in a manner that provides for sensor windowing, wherein the image capture device 100 only reads-out and processes a selected portion of the sensing elements 110 across the entire active area 116. For example, as shown in FIG. 3, by activating only the sensing elements 110 located within a small window of the active area 116, the readout area of the image sensor 104 (indicated by hatched box 122) may correspond to a small portion of the active area 116. Specifically, as shown, the windowed readout area 122 may define an area that is smaller than the active area 116, such as by defining a height 124 that is less than the height 118 of the active area 116. This may allow for the image capture device 100 to achieve a higher frame rate by reducing the amount of signal processing required by the controller 106. Additionally, as will be described below, such windowing may also allow for the focus of the image capture device 100 to be automatically adjusted based on the range of focus of the lens 102.

Additionally, in several embodiments, the position and/or orientation of the image sensor 104 within the image capture device 100 may be configured to be fixed in relation to the position and/or orientation of the lens 102. For example, as shown in FIG. 4, the image sensor 104 may be configured to be angled relative to the lens 102. Specifically, the active area 116 of the image sensor 104 may generally define an image plane (indicated by the reference line 126 extending parallel to the surface of the active area 116) that is angled relative to a fixed, lens plane (indicated by the reference line 128 extending parallel to a plane defined through the lens 102 that extends in a direction generally perpendicular to the direction of light through the lens 102). The lens plane 128 may generally be oriented parallel to a focal plane 140 of the lens 102 (described below). Thus, the angled orientation of the image plane 126 may generally be defined with reference to the lens plane 128 and/or the focal plane 140. It should be appreciated that the image plane 126 may be oriented relative to the lens plane 128 and/or the focal plane 140 at any suitable angle 130. However, in several embodiments, the angle 130 may be equal to an angle that is greater than zero degrees and less than about 10 degrees, such as an angle ranging from about 0.5 degrees to about 6 degrees or from about 1 degree to about 4 degrees or from about 2 degrees to about 3 degrees and all other subranges therebetween.

It should be appreciated that, in alternative embodiments, the position and/or orientation of the image sensor 104 relative to the position and/or orientation of the lens 102 may be adjustable. For example, the spacing between the image sensor 104 and the lens 102 may be adjustable (e.g., via a suitable mechanical arrangement) to allow for coarse adjustment of the focus of the image capture device 100.

Referring particularly to FIG. 4, as is generally understood, the light or image projected onto the image sensor 104 from the lens 102 may generally be focused into a light cone 132 including both a converging portion 134 and a diverging portion 136. The intersection of the converging and diverging portions 134, 136 (indicated by point 138) may generally be defined on a plane 140 corresponding to the plane of optimal focus or focal plane of the lens 102 (i.e., the plane upon which the image projected from the lens 102 is completely focused). Thus, as the distance at which the sensing elements 110 of the image sensor 104 are spaced apart from the focal plane 140 increases, the focus or sharpness of the image captured by image capture device 100 may decrease. This generally creates a depth of field or range of focus 142 corresponding to a distance forward and back of the focal plane 140 at which an image appears to be in focus or sharp to the human eye (e.g., where the circle of confusion (i.e., the width of the light cone 132) is smaller than the Airy Disc (i.e., diffraction limit)). For example, as shown in FIG. 4, first and second planes 144, 146 may be defined along the converging and diverging positions 134, 136 of the light cone 132 at a distance 148 from the focal plane 140, thereby defining the range of focus 142 of the lens 102.

It should be appreciated by those of ordinary skill in the art that the focal plane 140 of an ideal lens may be exactly planar. However, due to curvature, the focal plane 140 of an actual lens 102 may be slightly curved or non-planar. Thus, the term "focal plane" is used herein to describe any suitable reference plane, line or curve along which the image projected from the lens 102 is completely focused.

In several embodiments, by angling the image sensor 104 relative to the lens 102 as described above, only a portion of the sensor's active area 116 may be located within the range of focus 142 of the lens 104. Thus, the controller 106 may be configured to control the image sensor 104 such that the readout area 122 of the sensor 104 only corresponds to a window contained within the portion of the active area 116 that is located within the range of focus 142. For example, as shown in FIG. 4, due to the orientation of the image sensor 104, a middle portion of the active area 116 (defined between the first and second planes 144, 146) may be located within the range of focus 142 while upper and lower portions of the active area (defined above the second plane and below the first plane, respectively) may be located outside the range of focus 142. In such an embodiment, the controller 106 may be configured to activate all or a portion of the sensing elements 110 located within the middle portion of the active area 116. For example, as particularly shown in FIG. 3, the controller 106 may set the position of the readout area 122 of the image sensor 104 such that it is centered about the intersection of focal plane 140 of the lens 102 and the image plane 126 of the sensor 104. As such, the image sensor 104 may only detect light within the range of focus 140 of the lens 102, thereby ensuring that the entire image generated by the image capture device 100 is in focus.

However, in alternative embodiments, the readout area 122 may extend beyond the portion of the active area 116 that is located within the range of focus 142. Moreover, depending on the angle 130 at which the image sensor 104 is oriented, it should be readily appreciated that the entire active area 116 of the sensor 104 may be located within the range of focus 142 of the lens 104.

Figure 5:
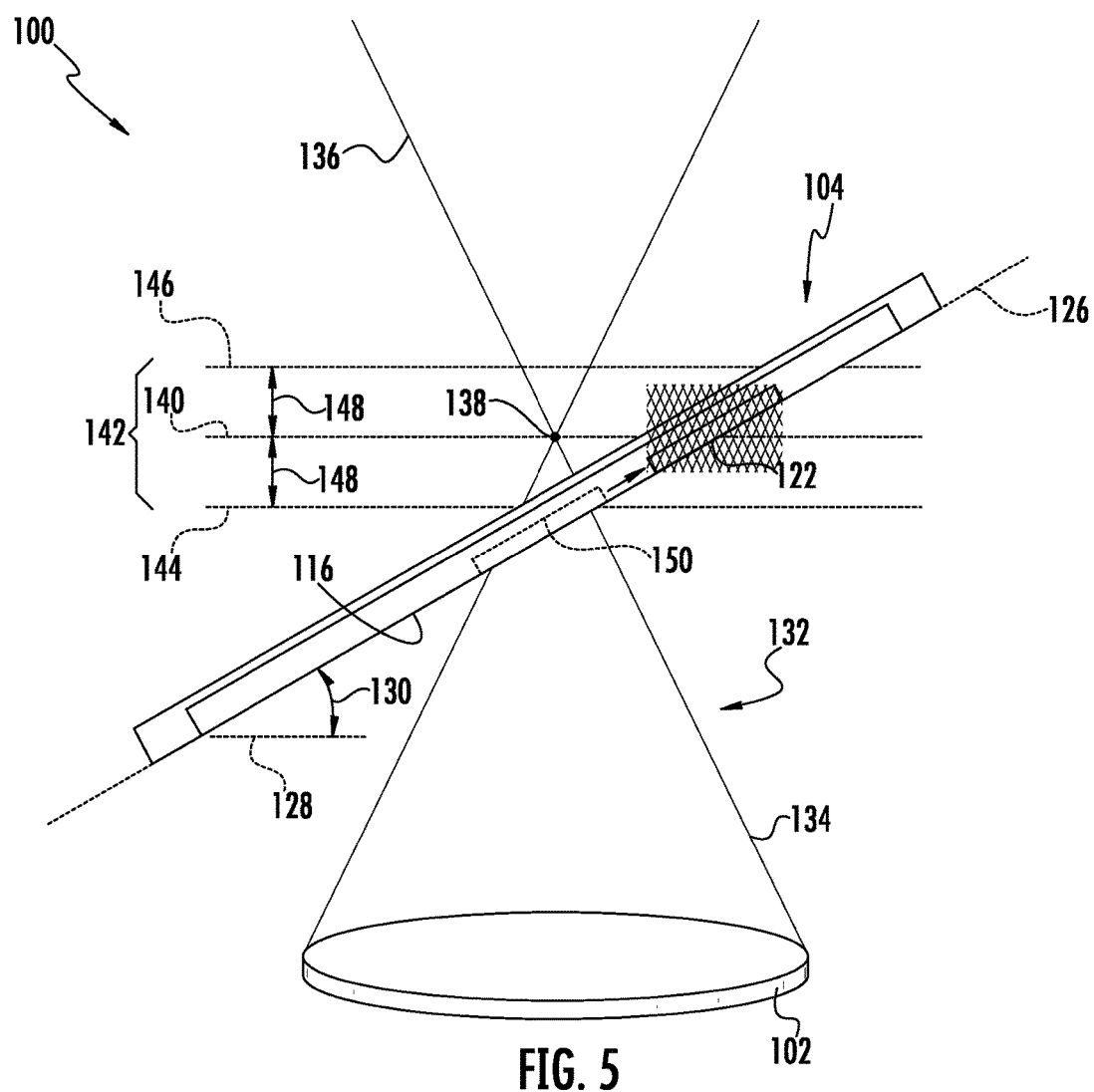
FIG. 5 illustrates another side view of the image sensor and lens shown in FIG. 4, particularly illustrating an embodiment in which the focal plane of the lens has been shifted upwards.

It should be readily appreciated by those of ordinary skill in the art that, due to variations in the operating conditions of the image capture device 100 (e.g., variations in temperature, pressure, etc.), the position of the intersection of the focal plane 140 with the image plane 126 may change. This particularly true given the fact that, in several embodiments, the image sensor 104 may be fixed in position relative to the lens 102. For example, FIG. 5 illustrates the lens 102 and image sensor 104 shown in FIG. 4 in an embodiment in which the focal plane 140 of the lens 102 has shifted upward due to changing operating conditions. In such an embodiment, the controller 106 may be configured to adjust the position of the readout area 122 along the image sensor 104 to account for such change in position of the focal plane 140. Specifically, as shown in FIG. 5, the readout area 122 may be shifted upward along the active area 116 of the image sensor 104 (the previous readout area being indicated by dashed box 150) such that the new readout area 122 is contained within the portion of the active area 116 that is located within the shifted range of focus 142. Thus, by adjusting the readout area 122 of the image sensor 104 in relation to the focal plane 140 of the lens 102, the image sensor 104 may be controlled so that only the sensing elements 110 positioned within the instantaneous range of focus 142 of the lens 102 are activated, thereby providing the ability to consistently capture sharp, in-focus images.

It should also be appreciated that the controller 106 may be configured to detect the position of the focal plane 140 relative to the image sensor 104 using any suitable means and/or method. For example, in one embodiment, the controller 106 may be configured to capture one or more full-frame images by activating the entire active area 116 such that light is detected and read out by each of the sensing elements 110 of the image sensor 104. In such an embodiment, suitable image processing algorithms and/or instructions may be stored within the controller's memory 114 that enable the controller 106 to analyze the full-frame image(s) to determine the point at which the focus within the image(s) is optimal (i.e., the location of the focal plane 140). The controller 106 may then set the position of the readout area 122 such that it is centered about this point.

In another embodiment, the controller 106 may be configured to utilize a dead-reckoning approach in which the position of the focal plane 140 relative to the image sensor 104 is calculated and/or estimated using known relationships between the optical properties of the lens 102 and the operating parameters of the image capture device 100. For example, suitable equations, mathematical relationships, calibration data and/or the like may be stored within the controller's memory 114 that relate the focal distance of the lens 102 (i.e., the distance between the lens 102 and the focal plane 140) to various operating parameters, such as pressure and/or temperature. In addition, a baseline focal distance may be stored within the controller's memory 114 that corresponds to a known position of the focal plane 140 at a given pressure and/or temperature. In such an embodiment, the controller 106 may be configured to receive inputs regarding the operating parameters of the image capture device 100 from suitable sensors (e.g., one or more pressure sensors and/or temperature sensors) and, based on such inputs, calculate or estimate the position of the focal plane 140 relative to the image sensor 104. The readout area 122 for the image sensor 104 may then be set based on the calculated or estimated position of the focal plane. 140

In a further embodiment, as an alternative to capturing and analyzing full-frame images, the controller 106 may be configured to analyze the sharpness of partial-frame images captured using the sensing elements 110 positioned within certain portions of the active area 116. For example, similar to the windowed readout area 122 shown in FIG. 3, the controller 106 may be configured to capture images by activating the sensing elements 110 within different strips and/or areas along the height 118 and/or width 120 of the active area 116. In such an embodiment, the images may then be analyzed using suitable image processing algorithms and/or instructions to determine the location along the active area 116 at which the focus is optimal (i.e., the location of the focal plane 140). The controller 106 may then set the position of the readout area 122 such that it is centered about this point.

Additionally, the controller 106 may also be configured to detect changes in the position of the focal plane 140 relative to the image sensor 104 by comparing the sharpness of the top and the bottom of each captured frame. In particular, the controller 106 may be configured continuously analyze the sharpness of each captured frame. If the top of the frame is or becomes consistently sharper than the bottom of the frame, it can be assumed that the focal plane 140 has shifted upward relative to the image sensor. In such an embodiment, as shown in FIG. 5, the readout area 122 may be shifted upward along the active area 116 in order to ensure that the readout area 122 is maintained within the range of focus 142 of the lens 102. Similarly, if the bottom of the frame is or becomes consistently sharper than the top of the frame, the readout area 122 may be shifted downward along the active area 116 in order to align the readout area 122 within the range of focus 142.

As described above, the controller 106 of the image capture device 100 may, in several embodiments, be configured to set the readout area 122 such that it is contained entirely within the range of focus 142 of the lens 102. However, in alternative embodiments, the readout area 122 may be set by the controller 106 such that it extends beyond the range of focus 142 of the lens 102. Additionally, it should be appreciated that the readout area 122 need not be centered about the focal plane 140 of the lens 102. For instance, in one embodiment, the readout area 122 may be offset from the focal plane 140 by a given distance.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for capturing images of the earth's surface from an elevated location, the system comprising:
   an aeronautical body designed to be used above the earth's surface; and
   an aerial image capture device mounted to the aeronautical body such that the aerial image capture device has a field of view encompassing at least a portion of the earth's surface over which the aeronautical body is located, the aerial image capture device comprising:
   an optical element configured to create a light cone having a focal plane;
   an image sensor having an active area defining an image plane that is angled relative to the optical element; and
   a controller communicatively coupled to the image sensor, the controller being configured to control the image sensor such that light is detected by a readout area of the active area, the controller being configured to detect variations in a position of the focal plane relative to the image sensor caused by changes in at least one environmental operating condition associated with the aerial image capture device,
   wherein the controller is configured to adjust the readout area based on the detected variations in the position of the focal plane relative to the image sensor.

2. The system of claim 1, wherein the image sensor is fixed in position relative to the optical element.

3. The system of claim 1, wherein the focal plane is positioned within a range of focus of the optical element, the image plane being angled relative to the optical element such that only a portion of the active area is positioned within the range of focus.

4. The system of claim 1, wherein the controller is configured to adjust the readout area such that the readout area is centered about an intersection of the focal plane and the image plane.

5. The system of claim 1, wherein the at least one environmental operating condition comprises at least one of an air pressure or an air temperature associated with the aerial image capture device.

6. The system of claim 5, wherein a baseline focal distance is stored within memory of the controller that corresponds to a known position of the focal plane for at least one of a predetermined air pressure or a predetermined air temperature.

7. The system of claim 6, wherein the controller is configured to estimate the position of the focal plane relative to the image sensor based on the baseline focal distance.

8. A system for capturing images of the earth's surface from an elevated location, the system comprising:
   an aerial image capture device having a field of view encompassing at least a portion of the earth's surface, the aerial image capture device comprising:
   an optical element configured to create a light cone having a focal plane;
   an image sensor having an active area defining an image plane that is angled relative to the optical element; and
   a controller communicatively coupled to the image sensor, the controller being configured to control the image sensor such that light is detected by a readout area of the active area, the controller being configured to detect variations in a position of the focal plane relative to the image sensor caused by changes in at least one environmental operating condition associated with the aerial image capture device, the controller being further configured to adjust the readout area based on the detected variations in the position of the focal plane relative to the image sensor,
   wherein the aerial image capture device is configured to be mounted to an aeronautical body designed to be used above the earth's surface so as to allow the aerial image capture device to capture images of at least a portion of the earth's surface over which the aeronautical body is located.

9. The system of claim 8, wherein the image sensor is fixed in position relative to the optical element.

10. The system of claim 8, wherein the focal plane is positioned within a range of focus of the optical element, the image plane being angled relative to the optical element such that only a portion of the active area is positioned within the range of focus.

11. The system of claim 8, wherein the controller is configured to adjust the readout area such that the readout area is centered about an intersection of the focal plane and the image plane.

12. The system of claim 8, wherein the at least one environmental operating condition comprises at least one of an air pressure or an air temperature associated with the aerial image capture device, the controller being configured to monitor the at least one of the air pressure or the air temperature based on received sensor measurement and determine the positio of the focal plane based at least in part on the received sensor measurements.

13. The system of claim 12, wherein a baseline focal distance is stored within memory of the controller that corresponds to a known position of the focal plane for at least one of a predetermined air pressure or a predetermined air temperature.

14. The system of claim 13, wherein the controller is configured to estimate the position of the focal plane relative to the image sensor based on the baseline focal distance.

15. A method for operating an aerial image capture device, the method comprising:
   positioning the aerial image capture device at an elevated location above the earth's surface such that the aerial image capture device has a field of view encompassing at least a portion of the earth's surface over which the aerial image capture device is located;
   identifying variations in a position of a focal plane associated with the aerial image capture device relative to the image sensor caused by changes in at least one environmental operating condition associated with the aerial image capture device;
   adjusting a readout area for an image sensor of the aerial) image capture device based on the identified variations in the position of the focal plane relative to the image sensor, the image sensor having an active area defining an image plane that is angled relative to an optical element of the aerial image capture device; and
   controlling the image sensor such that light is sensed by the readout area.

16. The method of claim 15, wherein selecting the readout area for the image sensor based on the position of the focal plane relative to the image sensor comprises centering the readout area about an, intersection of the focal plane and the image plane.

17. The method of claim 15, fluffier comprising estimating the position of the focal plane relative to the image sensor based at least in part on the at least one environmental operating condition associated with the aerial image capture device.

18. The method of claim 15, wherein the focal plane is positioned within a range of focus of the optical element and the image sensor is angled relative to the optical element such that only a portion of the active area is positioned within the range of focus, wherein adjusting readout area for the image sensor comprises adjusting the readout area such that the readout area is fully contained within the portion of the active area that is positioned within the range of focus.

19. The method of claim 15, wherein the at least one environmental operating condition comprises at least one of an air pressure or an air temperature associated with the aerial image capture device, further comprising monitoring the at least one of the air pressure or the air temperature based on sensor measurements received from at least one sensor.

20. The method of claim 19, further comprising estimation the position of the focal plane based at least in part on a baseline focal distance for the image capture device, the baseline focal distance corresponding to a known position of the focal plane for at least one of a predetermined air pressure or a predetermined air temperature.

* * * * *